US005549793A

United States Patent [19]
Hellstrom et al.

[11] Patent Number: 5,549,793
[45] Date of Patent: Aug. 27, 1996

[54] CONTROL OF DILUTION LINES IN A DILUTION HEADBOX OF A PAPER MAKING MACHINE

[75] Inventors: Ake A. Hellstrom; Alexsey Goldshdeyn, both of Columbus, Ohio

[73] Assignee: ABB Industrial Systems, Inc., Columbus, Ohio

[21] Appl. No.: 284,939

[22] Filed: Aug. 2, 1994

[51] Int. Cl.⁶ .................. D21F 1/08; F16K 7/04
[52] U.S. Cl. ............... 162/258; 162/259; 251/4; 251/58
[58] Field of Search .................. 251/4, 5, 7, 9; 162/258, 259, 216; 137/351, 513.3, 513.5, 513.7, 852, 853, 530, 625.61

[56] References Cited

U.S. PATENT DOCUMENTS

| | | | |
|---|---|---|---|
| 3,522,926 | 8/1970 | Bryant et al. | 251/5 |
| 3,556,461 | 1/1971 | Little | 251/5 |
| 3,927,369 | 12/1975 | Billeter et al. | 324/58.5 |
| 4,066,534 | 1/1978 | Arya | 209/82 |
| 4,073,467 | 2/1978 | Little et al. | 251/7 |
| 4,135,550 | 1/1979 | Andersson | 137/565 |
| 4,195,810 | 4/1980 | Lavin | 251/5 |
| 4,372,528 | 2/1983 | Raftis | 251/4 |
| 4,523,737 | 6/1985 | Wentworth | 251/4 |
| 4,694,861 | 9/1987 | Goodale et al. | 137/624.19 |
| 4,898,643 | 2/1990 | Weisshuhn et al. | 162/259 |
| 4,899,783 | 2/1990 | Yusko, Jr. et al. | 137/556 |
| 4,909,904 | 3/1990 | Kinzler . | |
| 4,987,924 | 1/1991 | Rush et al. | 137/614.18 |
| 5,097,868 | 3/1992 | Betush | 137/595 |
| 5,102,228 | 4/1992 | Vine-Lott | 366/3 |
| 5,107,883 | 4/1992 | Shaw . | |
| 5,196,091 | 3/1993 | Hergert | 162/258 |
| 5,206,568 | 4/1993 | Björnson et al. | 318/568.1 |
| 5,273,905 | 12/1993 | Muller et al. | 435/301 |

FOREIGN PATENT DOCUMENTS 3639823 6/1988 Germany.
3715551 12/1988 Germany.

Primary Examiner—Donald E. Czaja
Assistant Examiner—Calvin Padgett
Attorney, Agent, or Firm—Killworth, Gottman, Hagan & Schaeff

[57] ABSTRACT

Pinch valves having a flexible, constrictable sleeve are used to control a dilution headbox for a paper making machine. A variety of pinch valves may be used in the present invention with the pinch valves being actuated by pneumatic or hydraulic pressure or by mechanically pinching the valves' sleeves by means of rams driven by stepper or linear drive motors. For pneumatic control, dynamic differential pressure drops are measured across the valves to determine flow rate through the valves. A pinch valve, referred to herein as a torsional pinch valve, is disclosed for dilution headbox control. In one form, a first end of a sleeve is fixedly mounted in a support frame and the second end of the sleeve is mounted for rotation in the frame. A driver rotates the second end of the sleeve such that a flow path through the sleeve is controlled. The flow path is a maximum when no torsion is placed on the sleeve and is reduced to substantially zero by sufficient rotation. In another form, first ends of two sleeves are secured into a support frame such that the sleeves are in axial alignment with one another. The second ends of the sleeves are secured to an annular collar or sleeve support member which is mounted for rotation between the fixedly mounted first ends. By rotating the annular collar, the cross section of the flow path is controlled.

10 Claims, 4 Drawing Sheets

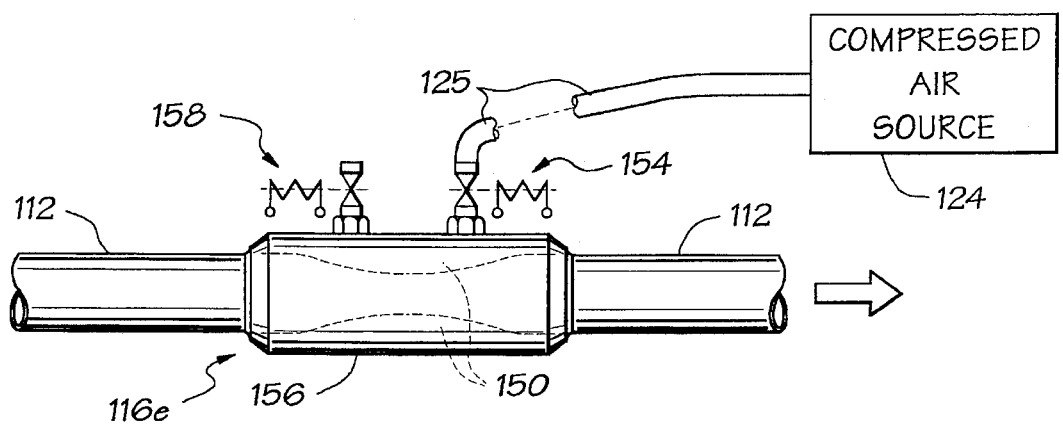
FIG. 7
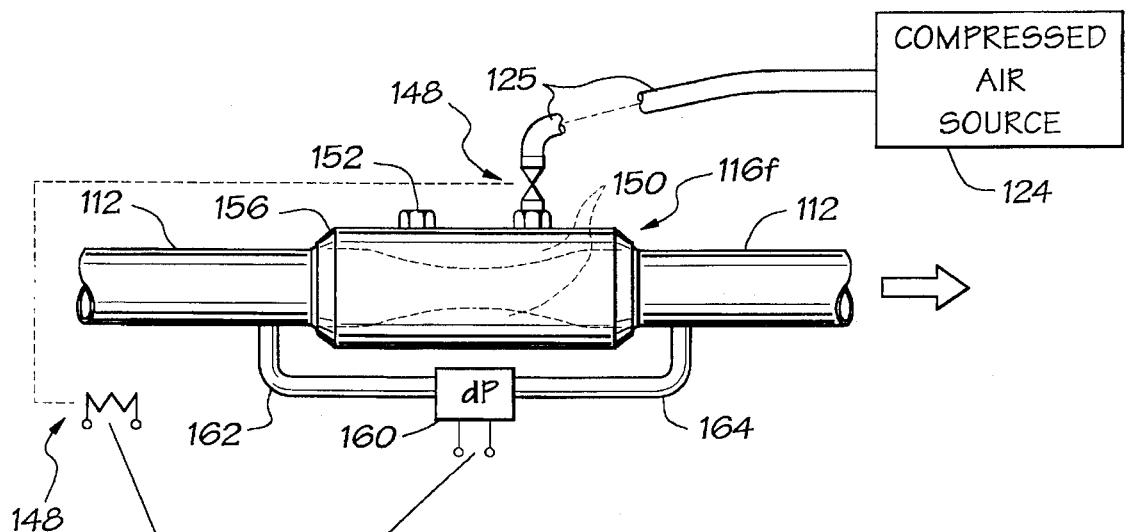
FIG. 8
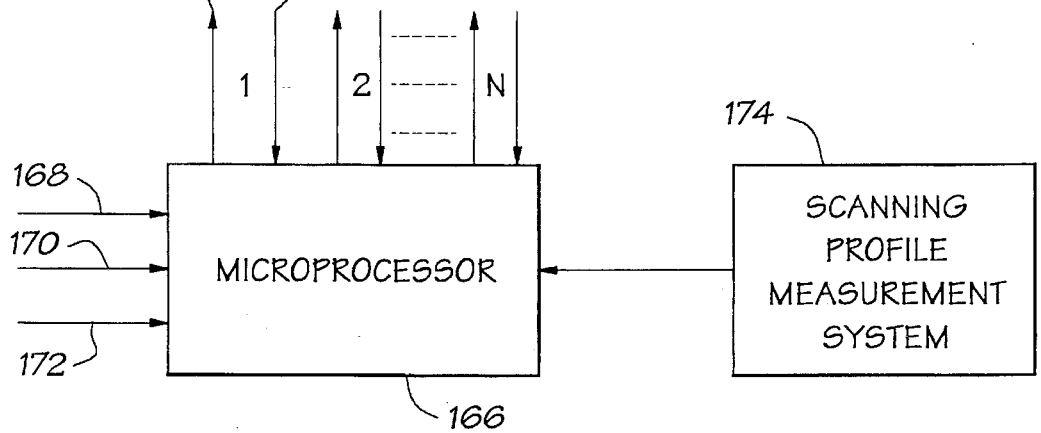

CONTROL OF DILUTION LINES IN A DILUTION HEADBOX OF A PAPER MAKING MACHINE

BACKGROUND OF THE INVENTION

The present invention relates in general to a dilution headbox for ejecting stock onto a forming wire for forming a web of paper and, more particularly, to the control of dilution lines inserted into the headbox for controlling the dilution of stock flowing through the headbox and thereby the basis weight of the paper web produced.

In paper making machines, a pulp slurry referred to as stock is fed under pressure into a headbox which ejects the stock onto a forming wire through a slice opening to form a web of paper. In the past, a lip defining the slice opening has been controlled along its length to control the basis weight profile of the web of paper.

In a relatively new type of headbox control arrangement, the slice lip is not controlled. Rather, the basis weight profile of the web of paper is controlled by means of a series of dilution pipes or lines which extend across the width of the headbox. Water is controllably injected into the dilution lines to locally control the stock dilution thereby forming a variable consistency profile leaving the slice opening. By adjusting the amount of dilution at a plurality of points of the headbox across the machine, for example in response to a measured basis weight profile from on-line scanners, the basis weight profile of the web is controlled.

To precisely control the basis weight profile of a paper web being produced, it is apparent that the water flow in each of the dilution lines must be accurately and reliably controlled. In existing designs, this control has been performed by using conventional servo controlled ball valves, gate valves and needle valves with one valve and actuator per dilution line.

For proper control of dilution headboxes, the number of valves across the headboxes tends to be large, 200 or more valves being required for a dilution headbox for a wide paper making machine. Unfortunately, the conventional servo controlled valves used in existing headbox designs present serious limitations in terms of cost and reliability.

Each of the conventional valves represents a complex mechanical and electrical system including numerous moving parts which present a risk of leaks, jamming, stiction and similar problems. Further, the valves must operate in a harsh environment and conduct white water, which is used in the dilution process and contains substantial amounts of fines even when cleaned, such that deposits tend to build up within the valves. Accordingly, not only are the conventional servo controlled valves expensive, but also, under these operating conditions and with such a large number of valve systems, there is a high probability that one or more of the valves will frequently malfunction.

Another problem with conventional control valves for use in dilution headbox designs is the size of the control valves themselves. In state-of-the-art dilution headboxes, it may be desirable to have dilution lines spaced approximately every 40 mm (≈1.6 inches) center-to-center across the headbox. Accordingly, a control device having a very narrow footprint is required and it may be impossible to achieve this spacing with conventional servo control valves.

Still another problem with conventional control valves for use in dilution headbox designs is the lack of feedback to indicate that the flow of white water through the valves is changing in response to changes in the settings of the valves. For example, a valve could be plugged or clogged with fibers such that there is no or little flow change as the valve is opened. Such operation causes control actions at a clogged valve to accumulate and possibly result in variations in the basis weight profile around that point in the paper web if the clog is partially or completely cleared as the valve is operated. Conventional flow meters are too expensive and complex to use in the large quantities required by a dilution headbox control system.

It is, thus, apparent that there is a need for an improved control system and control valves for individually controlling the dilution lines in dilution headboxes. The control system and control valves must be inexpensive, reliable and able to accurately control the flow of dilution water through the dilution lines of dilution headboxes even as the density of the dilution lines increases with the advances in the art. Further, the valves preferably could be easily maintained and serviced without shutdown of the paper making machine except for total valve replacement, for example during overhaul of the machine. It would also be desirable for the valves to provide flow signals to the control system for diagnostic and maintenance purposes without requiring the expense and complexity of conventional flow meters.

SUMMARY OF THE INVENTION

This need is met by the present invention wherein previously used dilution control valves are replaced by valves having a flexible, constrictable membrane or sleeve. A common form of these valves is referred to as a pinch valve. While a variety of constrictable membrane forms are possible, sleeves are preferred for the present invention. Sleeve pinch valves provide a smooth interior surface for the flow path which reduces fouling or contamination of the valves when used to carry white water to a dilution headbox.

In conventional flow control valves, there are sharp corners and cavities where paper fibers tend to accumulate and flow irregularities within the valves which encourage such accumulations. These paper fine accumulations can eventually lead to valve clogging requiring removal and disassembly for cleaning of the valves. With smooth sleeve pinch valves, the possibility of fine build-up and clogging is greatly reduced and, if sufficient fouling occurs to require cleaning, the valves can be easily cleaned.

The smooth interior also reduces friction in the flow path and hence less pumping power and lower pressures can be used. In addition, a pinch valve provides a substantially leak-free, sealed flow path which can be used to carry white water even while an associated actuator is being maintained or repaired. Further, a controller or controllers' associated with each pinch valve can be sealed to prevent contamination or fouling by the harsh environment of a paper mill.

During maintenance or repair of a pinch valve, the flow path can be maintained approximately at a preferred position by means of a manually controlled actuator which can be utilized when an automatically controlled actuator is being serviced. Also, pinch valves can be actuated by several different arrangements including a variety of pneumatic or hydraulic arrangements for applying pressure to constrict or pinch the membrane or sleeve of the pinch valve, and by mechanically pinching the membrane or sleeve by means of a ram driven by an appropriate control motor such as a stepper motor or linear drive motor.

A novel form of pinch valve, referred to herein as a torsional pinch valve is also disclosed for use in the dilution control arrangement of the present application. In its simplest form, a first end of a flexible, constrictable sleeve is fixedly mounted in a support frame and the second end of the sleeve is mounted for rotation in the support frame. A manual or preferably automatic driver is provided for rotating the second end of the sleeve such that a flow path defined through the sleeve can be controlled. The flow path is at a maximum when the second end is in a neutral position placing no torsion on the sleeve and can be reduced to substantially zero by sufficient rotation. Since the valves for a dilution headbox do not need to be entirely closed, it is contemplated that the torsional pinch valve would be operable to provide a flow path ranging from approximately 25% to 100%.

A torsional pinch valve can also be formed by fixing first ends of two flexible, constrictable sleeves into a support frame such that the sleeves are in axial alignment with one another. The second ends of the sleeves are secured to an annular collar or sleeve support member which is mounted for rotation between the fixedly mounted first ends. By rotating the annular collar, the cross section of the flow path through the aligned sleeves can be controlled in accordance with the teachings of the present application. The torsional pinch valve may be cleaned by reversing the rotational direction of the annular collar while the valve is conducting white water such that the interior surface of the valve is moved to dislodge fouling or contamination which may have lodged thereon.

In accordance with one aspect of the present invention, an apparatus is provided for controlling at least one characteristic of a web of paper produced by a paper making machine including a headbox for receiving and feeding pulp slurry onto a wire for formation of a paper web. The headbox includes a plurality of dilution lines inserted therein with the apparatus comprising a plurality of pinch valves corresponding in number and connected individually to the plurality of dilution lines for controlling the flow of dilution water through the plurality of dilution lines. A control system is coupled to the plurality of pinch valves for controlling the plurality of pinch valves to regulate the flow of pulp slurry from the paper making machine.

In one form of the apparatus, each of the plurality of pinch valves comprises a pneumatic pressure sleeve and the control system comprises a pneumatic controller coupled to each of the pneumatic pressure sleeves via a conduit for controlling pressures within each of the pneumatic pressure sleeves.

In another form of the apparatus, the control system may comprise a plurality of pinch valve controllers connected to the pinch valves with each of the plurality of pinch valves comprising a pneumatic pressure sleeve and the pinch valve controllers each comprising at least one pneumatic valve. The control system then controls the at least one pneumatic valve at each of the pinch valves for controlling pressure within each of the pneumatic pressure sleeves. For example, the at least one pneumatic valve of each of the plurality of pinch valve controllers may comprise a pulse width modulated valve and the pinch valve controllers may further comprise a controlled fluid leak orifice.

Alternately, the plurality of pinch valve controllers may each comprise an inlet valve for increasing pressure within each pneumatic pressure sleeve and a vent valve for decreasing pressure within each pneumatic pressure sleeve. Each of the plurality of pinch valve controllers may also comprise a ram movable toward and away from a pinch element for example by a stepper or linear drive motor.

The control characteristics of pinch valves involves a very non-linear and not necessarily long term stable relationship between the actuating force, particularly pneumatic or hydraulic pressure, and flow rate. This has generally limited the use of pinch valves in precision flow control applications. For the dilution headbox control of the present application however, the flow rates of the individual pinch valves can be accurately determined by measuring the dynamic differential pressure across each of the valves since the pressure of the white water entering the valves is substantially the same for all the valves and the pressure within the headbox is substantially the same for all the valves. The flow rates for each of the valves can also be corrected or calibrated based on measurements of the pressure of the incoming white water and the pressure within the headbox. This determined flow rate for each of the valves permits precise flow control in spite of valve non-linearity and also gives valuable diagnostic feedback on the operation of each of the valves.

To be able to determine the flow rate through the pinch valves, each of the plurality of pinch valve controllers may comprise a differential pressure transducer for measuring the pressure differential from an inlet side of each of the plurality of pinch valves to an outlet side of each of the plurality of pinch valves. The pressure transducer generates a differential pressure signal representative of the measured pressure differential with the control system being responsive to differential pressure signals from the differential pressure transducers of the plurality of pinch valve controllers for controlling the plurality of pinch valves and thereby the dilution headbox.

The pinch valves may each comprise a flexible, constrictable sleeve defining a fluid flow path therethrough and having a first end for receiving fluid flowing into the fluid flow path and a second end for discharging fluid flowing from the fluid flow path. For this embodiment, a pinch valve support frame supports the sleeve by means of its first and second ends, the frame being adapted to permit rotation of at least one of the first and second ends of the sleeve. A valve controller is coupled to the pinch valve support frame for controlling the rotation of the at least one of the first and second ends of the sleeve such that a control area of the fluid flow path of the sleeve between the first and second ends is adjusted in accordance with the rotation.

Alternately, each of the plurality of pinch valves may comprise flexible, constrictable first and second sleeves each having first and second ends. A pinch valve support frame then supports the first and second sleeves in axial alignment with one another, the frame securing the first ends of each of the first and second sleeves at opposite ends of the frame. An annular sleeve support member secures the second ends of the first and second sleeves to one another to define a continuous fluid flow path through the first and second sleeves. The annular member is supported by the pinch valve support frame between the opposite ends of the frame, the frame being adapted to permit rotation of at least one of the first ends of the first and second sleeves and the secured second ends of the first and second sleeves. A valve controller is coupled to the pinch valve support frame for controlling the rotation of the at least one of the first ends of the first and second sleeves and the secured second ends of the first and second sleeves such that a control area of the continuous fluid flow path through the first and second sleeves is adjusted in accordance with the rotation.

In accordance with another aspect of the present invention, a torsional pinch valve for controlling fluid flow therethrough comprises a flexible, constrictable sleeve defining a fluid flow path. The sleeve has a first end for receiving fluid flowing into the fluid flow path and a second end for discharging fluid flowing from the fluid flow path. A pinch valve support frame supports the sleeve by means of the first and second ends of the sleeve, the frame being adapted to permit rotation of at least one of the first and second ends of the sleeve. A valve controller is coupled to the pinch valve support frame for controlling the rotation of the at least one of the first and second ends of the sleeve such that a control area of the fluid flow path of the sleeve between the first and second ends is adjusted in accordance with the rotation.

To accommodate axial contraction of the sleeve as it is twisted, the sleeve preferably comprises an axially expandable portion. In one form of the torsional pinch valve, the pinch valve support frame maintains the first end of the sleeve in a fixed position and permits rotation of the second end of the sleeve relative to the first end. For this form of the invention, the pinch valve support frame retains the second end of the sleeve in an annular sleeve support member which is received within bearings on the support frame for rotation about an axis of the annular sleeve support member. The valve controller is coupled between the pinch valve support frame and the annular sleeve support member. In an illustrative embodiment, the torsional pinch valve further comprises a worm gear extending around at least a portion of an outer periphery of the annular sleeve support member and a worm engaging the worm gear and mounted to the pinch valve support frame for rotation to thereby rotate the annular sleeve support member about its axis. For automatic control of the torsional pinch valve, a motor is mounted to the pinch valve support frame for rotating the worm.

In accordance with yet another aspect of the present invention, a torsional pinch valve for controlling fluid flow therethrough comprises flexible, constrictable first and second sleeves each having first and second ends. A pinch valve support frame supports the first and second sleeves in axial alignment with one another, the frame securing the first ends of each of the first and second sleeves at opposite ends of the frame. An annular sleeve support member secures the second ends of the first and second sleeves to one another to define a continuous fluid flow path through the first and second sleeves. The collar is supported by the pinch valve support frame between the opposite ends of the frame, the frame being adapted to permit rotation of at least one of the first ends of the first and second sleeves and the secured second ends of the first and second sleeves. A valve controller is coupled to the pinch valve support frame for controlling the rotation of the at least one of the first ends of the first and second sleeves and the secured second ends of the first and second sleeves such that a control area of the continuous fluid flow path through the first and second sleeves is adjusted in accordance with the rotation.

To accommodate axial contraction of the sleeve as it is twisted, at least one of the first and second sleeves each comprise an axially expandable portion. In an illustrated embodiment, the first ends of the first and second sleeves are secured by the frame against rotation and the annular sleeve support member is mounted for rotation within the frame for rotation of the secured second ends of the first and second sleeves. The annular sleeve support member is received within bearings on the support frame for rotation about an axis of the annular sleeve support member. The valve controller is coupled between the pinch valve support frame and the annular sleeve support member.

The torsional pinch valve may further comprise a worm gear extending around at least a portion of an outer periphery of the annular sleeve support member and a worm engaging the worm gear and mounted to the pinch valve support frame for rotation to thereby rotate the annular sleeve support member about its axis. For automatic control of the torsional pinch valve, a motor is mounted to the pinch valve support frame for rotating the worm.

It is, thus, an object of the present invention to provide an improved control system and control valves for individually controlling the dilution lines in dilution headboxes; to provide an improved control system and control valves for individually controlling the dilution lines in dilution headboxes by means of constrictable membranes or sleeves; and, to provide an improved control system utilizing torsional pinch valves for individually controlling the dilution lines in dilution headboxes.

Other objects and advantages of the invention will be apparent from the following description, the accompanying drawings and the appended claims.

BRIEF DESCRIPTION OF THE DRAWINGS

FIG. 7 is a schematic side view of a pneumatically operated pinch valve wherein pneumatic control is performed via two pilot control valves, one to increase pressure and one to decrease pressure;

FIG. 8 illustrates a microprocessor control system for controlling pinch valves used in a dilution headbox by measuring the dynamic differential pressure across the valves;

DETAILED DESCRIPTION OF THE INVENTION

Figure 1:
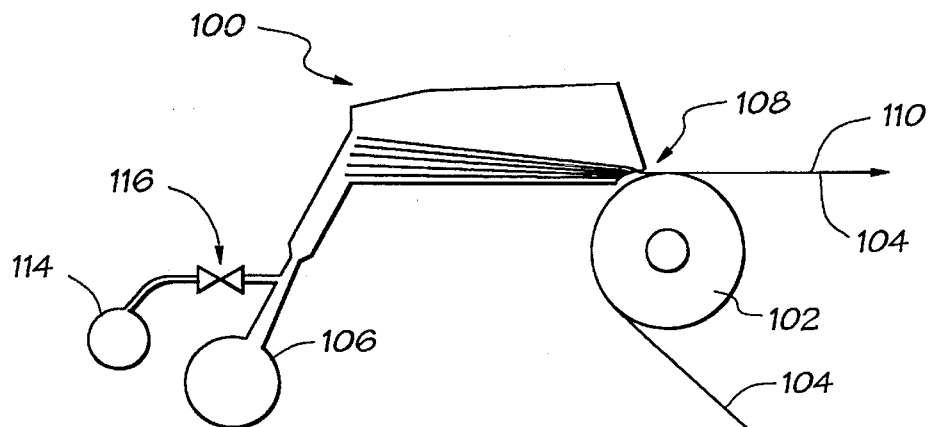
FIG. 1 is a schematic side view of a portion of a paper making machine showing a dilution headbox including the invention of the present application.
Figure 2:
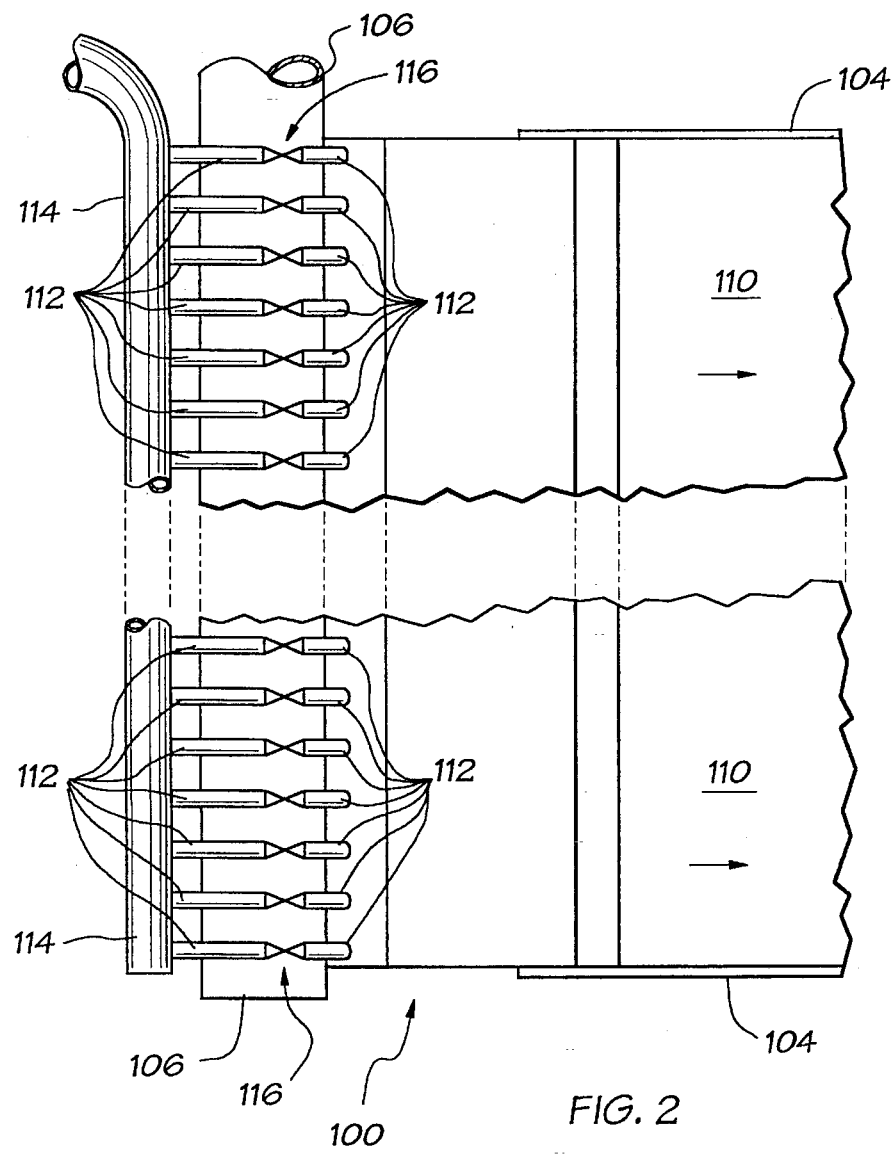
FIG. 2 is a schematic plan view of the portion of the paper making machine of FIG. 1 showing the plurality of dilution control valves which stretch across the dilution headbox of the paper making machine.

The invention of the present application will now be described with reference to the drawings wherein FIG. 1 schematically illustrates a side view of a dilution headbox 100 of a paper making machine including a breast roll 102 and a forming or Fourdrinier wire 104. Like elements throughout the drawing figures will be identified by the same reference numerals for clarity, ease of understanding and ease of description. Pulp slurry referred to as stock is fed under pressure into the headbox 100 by means of a stock header 106 which extends across the full width of the paper making machine. The dilution headbox 100 ejects stock onto the Fourdrinier wire 104 through a slice opening 108 to form a web 110 of paper.

In dilution headboxes, such as the headbox 100, the basis weight profile of the web 110 of paper is controlled by means of a series of dilution pipes or lines 112 which are spaced apart and extend across the width of the headbox 100. Water, preferably white water or cleaned white water, is controllably injected into the dilution lines 112 from a dilution header 114 to locally control the stock dilution thereby forming a variable consistency profile leaving the slice opening 108. By adjusting the amount of water and thereby dilution at a plurality of points of the headbox across the paper making machine corresponding to the dilution lines 112, for example in response to a measured basis weight profile from on-line scanners, the basis weight profile of the web 110 is controlled.

To precisely control the basis weight profile of the web 110 of paper being produced, it is apparent that the water flow in each of the dilution lines 112 must be accurately, reliably and independently controlled. In accordance with the present invention, the water flow in the dilution lines 112 is controlled by means of a series of valves having constrictable membranes or sleeves which are referred to as pinch valves 116. While it is possible to construct a large variety of valves including constrictable membranes, valves including sleeves are believed to be best for the present invention because they tend to provide a smoother interior surface for the flow path through the valve which reduces fouling or contamination of the valves when used to carry white water or cleaned white water to a dilution headbox.

In conventional flow control valves, there are sharp corners and cavities where paper fibers tend to accumulate and flow irregularities within the valves which encourage such accumulations. These paper fine accumulations can eventually lead to valve clogging requiring removal and disassembly for cleaning of the valves. With smooth sleeve pinch valves, the possibility of fine build-up and clogging is greatly reduced and, if sufficient fouling occurs to require cleaning, the valves can be easily cleaned.

The smooth interior also reduces friction in the flow path and hence less pumping power and lower pressures can be used. In addition, a pinch valve provides a substantially leak-free, sealed flow path which can be used to carry white water even while an associated actuator is being maintained or repaired. Further, a controller or controllers associated with each pinch valve can be sealed to prevent contamination or fouling by the harsh environment of a paper mill.

The control characteristics of pinch valves involves a very non-linear and not necessarily long term stable relationship between the actuating force, particularly pneumatic or hydraulic pressure, and flow rate. This has generally limited the use of pinch valves in precision flow control applications. For the dilution headbox control of the present application however, the flow rates of the individual pinch valves can be accurately determined by measuring the dynamic differential pressure across each of the valves as will be described.

These measurements are possible since the pressure of the white water entering the valves is substantially the same for all the valves and the pressure within the headbox is substantially the same for all the valves. The flow rates for each of the valves can also be corrected or calibrated based on measurements of the pressure of the incoming white water and the pressure within the headbox. This determined flow rate for each of the valves permits precise flow control in spite of valve non-linearity and also gives valuable diagnostic feedback on the operation of each of the valves.

Figure 3:
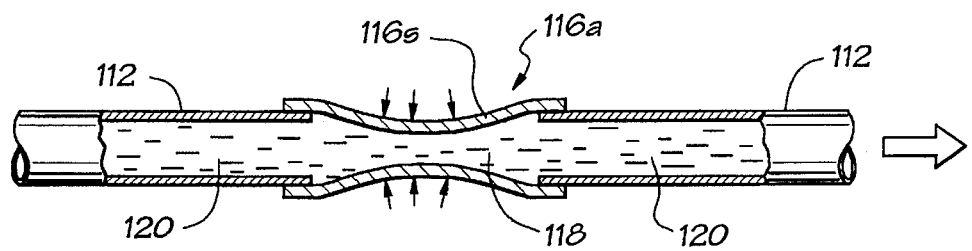
FIG. 3 is a cross-sectional schematic side view of a pinch valve illustrating general operation of the valve.

A generic pinch valve 116a is shown as being connected into one of the dilution lines 112 in FIG. 3. As shown, the pinch valve 116a includes a constrictable, flexible sleeve 116s which defines a flow path 118 therethrough. White water 120 including a substantial amount of fines is shown as flowing through the flow path 118 of the pinch valve 116a. As shown in FIG. 3, the sleeve 116s is constricted, squeezed or pinched to reduce the size of the flow path 118, as shown by the arrows directed inwardly on the sleeve 116s. Constriction or pinching of the pinch valve 116a can be performed by means of pneumatic pressure, hydraulic pressure, mechanical rams or the like. As used herein, "pneumatic" and "pneumatically" should be considered also to apply to hydraulic and hydraulically.

Figure 4:
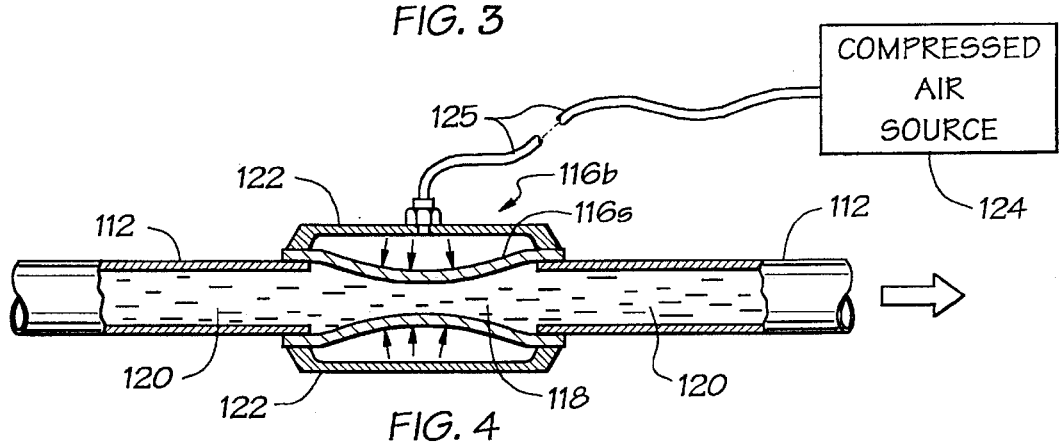
FIG. 4 is a cross-sectional schematic side view of a pneumatically operated pinch valve.

As shown in FIG. 4, a pneumatically controlled pinch valve 116b comprises a pneumatic pressure sleeve 122 which surrounds the flexible sleeve 116s. Compressed air from a compressed air source 124 is passed via a conduit 125 to the area between the pressure sleeve 122 and the flexible sleeve to control the size, i.e. cross-sectional area, of the flow path 118 through the valve: the higher the pressure of the compressed air, the smaller the size of the flow path 118; and, the lower the pressure of the compressed air, the larger the size of the flow path 118 with the upper limit generally being the relaxed size of the flexible sleeve 116s.

Figure 5:
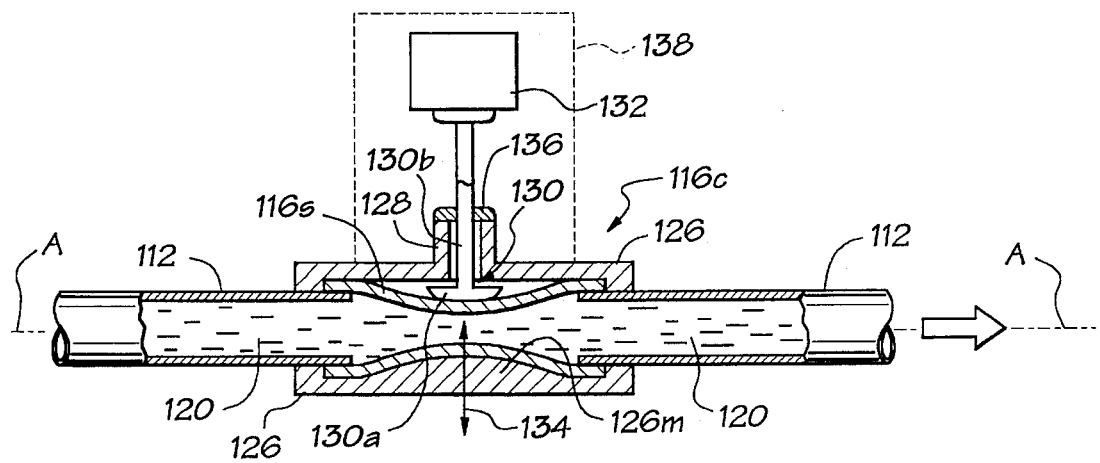
FIG. 5 is a cross-sectional schematic side view of mechanically operated pinch valve driven by a linear motor.

FIG. 5 illustrates a mechanically operated pinch valve 116c. For the pinch valve 116c, a housing 126 surrounds the flexible sleeve 116s and secures it in place, as shown, to one of the dilution lines 112. The housing 126 is thus generally sealed where it contacts one of the dilution lines 112 and defines an access opening through a nipple 128. In the mechanically operated pinch valve 116c illustrated in FIG. 5, a ram 130 defines a sleeve engaging portion 130a and a stem portion 130b which extends from the sleeve engaging portion 130a through the nipple 128 where it is coupled to a lead screw which is incorporated into a drive motor 132. The drive motor may be a stepper motor, a linear drive motor or any other appropriate drive motor. A suitable linear drive motor is available from Haydon Switch & Instruments or Waterbury, Conn. It should be apparent that almost any form of force applier can be used in the present invention including a wide variety of electric, pneumatic and hydraulic devices.

The drive motor 132 can be operated to move the ram 130 back and forth axially in line with the stem portion 130b and generally perpendicular to the axis A of the dilution line 112 to which it is connected as shown by the arrow 134. The sleeve engaging portion 130a of the ram 130 thus can be extended into the pinch element defined by the flexible sleeve 116s or retracted away from the pinch element defined by the flexible sleeve 116s to thereby close and open the flow path through the pinch valve 116c. The bottom portion of the interior of the housing 126 defines an upwardly extending mound 126m against which the flexible sleeve 116s can be forced by the ram 130 to thereby substantially close the pinch valve 116c.

It should be apparent that the ram 130 can also be manually controlled, for example by a mechanical screw or other device to manually control movement of the ram 130 and hence the pinch valve 116c. Both manual control and automatic control can also be provided such that the flow paths through the valves can be maintained approximately at a preferred position during maintenance or repair procedures. To protect the interior of the housing 126 from contamination, a seal 136 can be secured to the top of the nipple 128 for resiliently receiving the ram stem portion 130b therethrough. Further, a subhousing 138 can also be erected around the linear drive motor to prevent its contamination as well.

Figure 6:
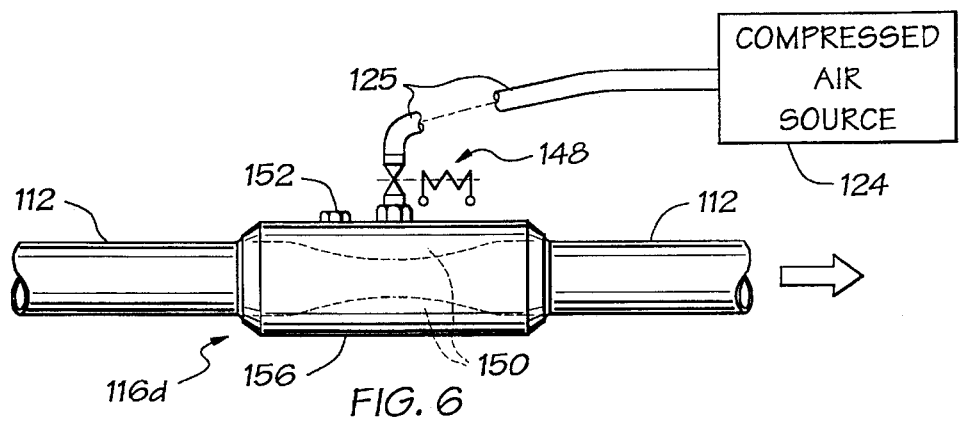
FIG. 6 is a schematic side view of a pneumatically operated pinch valve wherein pneumatic control is performed via a pilot control valve and leak orifice.

FIGS. 6 and 7 show schematic side views of pneumatically operated pinch valves 116d and 116e, respectively, wherein a control system for controlling the flow of fluid through the valves comprises pinch valve controllers connected to the pinch valves with each pinch valve controller comprising at least one pneumatic valve. The pneumatically operated pinch valve 116d shown in FIG. 6 includes a pneumatic valve 148 which is controlled to provide compressed air from the compressed air source 124 via a conduit 125 to the internal air chamber 150 of the valve 116d defined by the pneumatic pressure sleeve 156 and the internal sleeve of the valve. The pneumatic valve 148 can be operated in a pulse width modulated manner to control the pressure within the internal air chamber 150 as will be more fully described with reference to FIG. 8. A pneumatic valve particularly suitable for pulse width modulated control is commercially available from IC Sensors of California and is made using micro machined silicon technology to be small in size with no conventional moving parts. For the embodiment of FIG. 6, a controlled leak orifice 152 is also provided into the internal air chamber 150 defined by the pneumatic pressure sleeve 156 to gradually bleed air from the chamber 150.

Alternately, as shown in FIG. 7, the pinch valve controllers may each comprise an inlet valve 154 for increasing pressure within each internal air chamber 150 defined by the pneumatic pressure sleeve 156 and a vent valve 158 for decreasing pressure within each internal air chamber 150 defined by the pneumatic pressure sleeve 156.

FIG. 8 shows a schematic side view of a pneumatically controlled pinch valve 116f which is incorporated into a microprocessor control system for controlling pinch valves used in a dilution headbox by measuring the dynamic differential pressure across the valves. In a dilution headbox, all dilution lines are fed with pressurized white water or cleaned white water from the dilution header 114 giving a substantially constant pressure, at least equal pressure to all of the dilution lines 112, such that a substantially constant pressure is present at the inlet of all of the pinch valves 116. On the discharge side of the dilution lines 112, i.e. the ends that feed white water into the headbox 100 for local stock dilution, there is a relatively uniform back pressure for all of the dilution lines 112 across the headbox 100.

These inlet and outlet pressures of the dilution lines 112 can be used to infer the flow of white water in each of the lines by means of measuring the differential dynamic pressures across the control pinch valves 116 by means of differential pressure transducers, illustrated by the differential pressure transducer 160 connected across the pinch valve 116f in FIG. 8. In particular, the differential pressure transducer 160 is connected to the inlet side of the valve 116f by a conduit 162 and to the outlet side of the valve 116f by a conduit 164. A fully closed valve and zero flow causes a large pressure drop across the valve 116f with a maximum signal from the transducer 160 and a fully open valve results in a low pressure drop across the valve 116f with a minimum signal from the transducer 160.

Accordingly, a microprocessor 166 receives output signals from all differential pressure transducers 160 (1 through N) extending across the dilution headbox 100 and controls the pneumatic valves 148 (1 through N) of the valves 116f (1 through N) in response to the signals received from all differential pressure transducers 160. The microprocessor 166 also receives signals representing the water pressure in the dilution header 114 feeding all of the pinch valves 116f on an input 168; signals representing the total head in the headbox 100 and thereby the headbox internal back pressure on an input 170; and, signals indicating the operating status of the paper making machine, i.e. run/stop condition. In addition, the microprocessor receives information gathered by a web measurement system, such as a scanning profile measurement system 174, such that it can determine desired settings for all of the pinch valves 116f of the paper making machine to maintain a desired basis weight for the web 110 of paper.

The pneumatic valves 148 (1 through N) can be operated in a pulse width modulated (PWM) manner by the microprocessor 166. For such PWM operation, the valves 148 each receive a cycling open/close signal with the control pressure being set at any desired pressure by selecting the duty cycles for the cycling open/close signals provided to the valves. As is apparent to those skilled in the art, as the duty cycle for a given valve is increased, the pressure within that valve is increased; and, as the duty cycle for a given valve is decreased, the pressure within that valve is decreased. The volume of the bladder or internal air chamber 150 of each valve acts as a capacitor to filter out pressure pulsation. Since PWM control is well know to those skilled in the art, it will not be described further herein.

Figure 9:
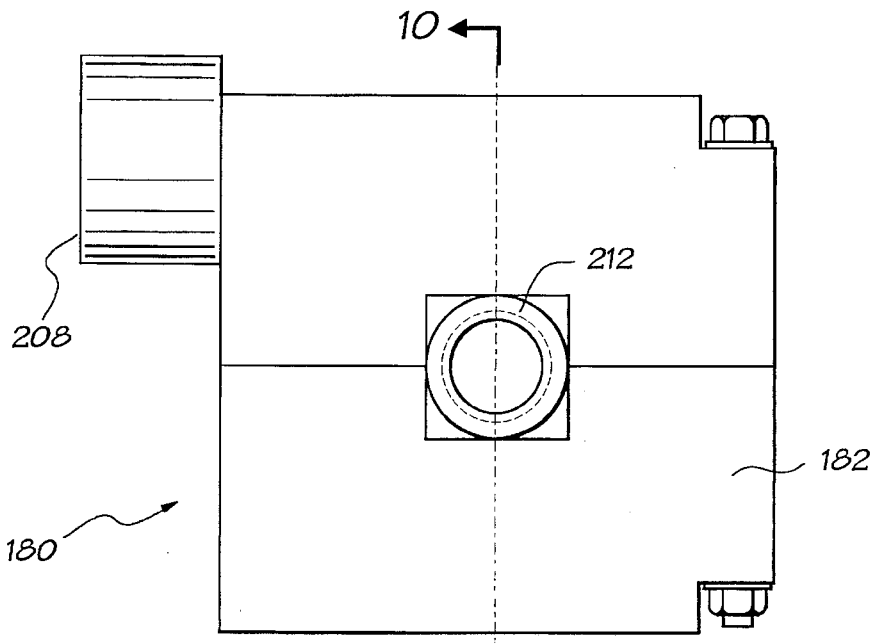
FIG. 9 is a side view of a torsional pinch valve for use in control of dilution lines in a dilution headbox.
Figure 10:
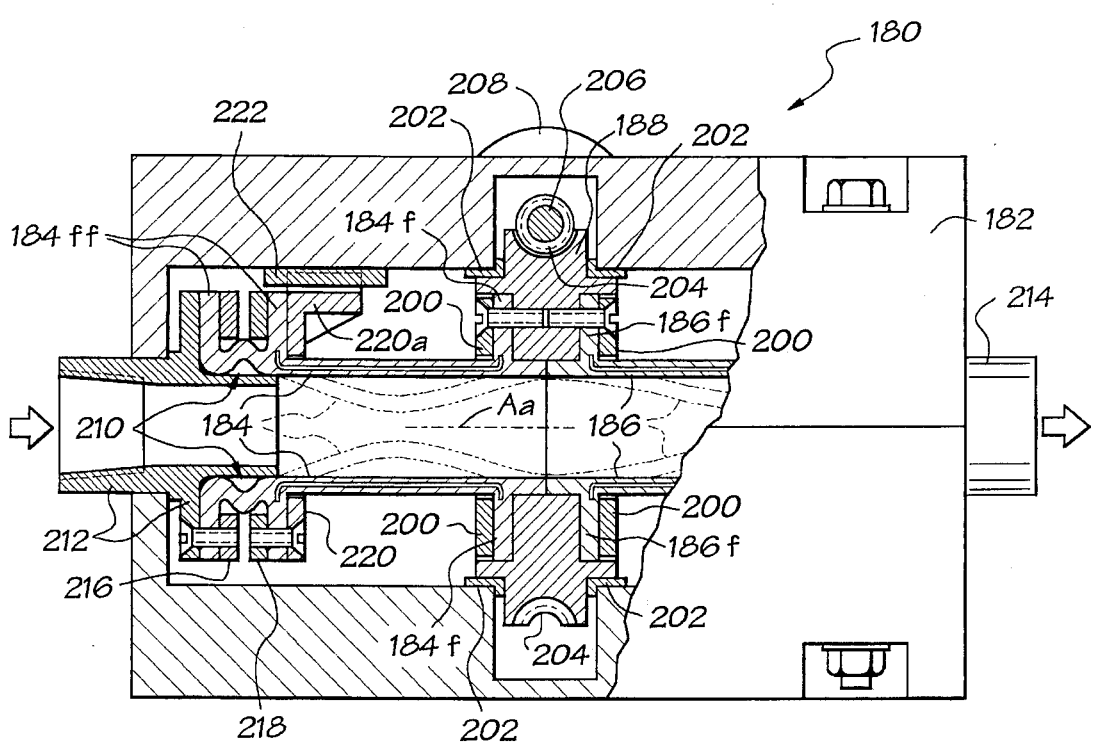
FIG. 10 is a partially sectioned side view of the torsional pinch valve of FIG. 9 taken along the section line 10—10.

Reference will now be made to FIGS. 9 and 10 which illustrate a torsional pinch valve 180 which has been developed for use in controlling the dilution lines 112 in the dilution headbox 100 of FIG. 1. The torsional pinch valve 180 provides a low cost and reliable valve that will provide high control resolution with a clog and chemical resistant controlling orifice. In the illustrated embodiment, the torsional pinch valve 180 includes a pinch valve support frame taking the form of a housing 182. First and second flexible, constrictable sleeves 184, 186, each having first and second ends, are supported in axial alignment with one another within the housing 182. The first and second sleeves 184, 186 are illustrated as having internal wires evenly spread within their sidewalls and can be made of rubber, tetrafluoroethylene or other appropriate material.

First ends of the first and second sleeves 184, 186 are secured at opposite ends of the housing 182 and, as illustrated, the first ends of the sleeves 184, 186 are fixedly mounted to prevent rotation. The second ends of the sleeves 184, 186 are permanently attached to an annular sleeve support member 188 which is mounted for rotation about an axis $A_a$ of the member 188 in the housing 182 between the opposite ends of the housing to which the first ends of the sleeves 184, 186 are secured. While only the annular sleeve support member 188 is mounted for rotation in the illustrated embodiment, it should be apparent that either one or both of the first ends of the sleeves 184, 186 could be mounted for rotation in addition to or instead of the member 188.

The second ends of the sleeves 184, 186 each include flanges 184f and 186f for permanent attachment to the annular sleeve support member 188 by plates 200 which are attached to the annular sleeve support member 188 by screws or other appropriate fasteners. The sleeve support member 188 is supported within the housing 182 by bearings 202 and defines a worm gear 204 around at least a portion of its outer periphery. A worm 206 engages the worm gear 204 and is mounted to the housing 182 for rotation to thereby rotate the annular sleeve support member 188 about its axis $A_a$. While the worm 206 can be manually driven by a knob or other appropriate device (not shown), as illustrated, the worm 206 is driven by a motor 208 which can be a stepper motor, linear motor or other appropriate form of control motor.

The first ends of the sleeves 184, 186 are substantially identical to one another and, accordingly, only the first end of the first sleeve 184 is illustrated in FIG. 10. As thus illustrated, the first ends of the sleeves 184, 186 define a pair of flanges 184*ff* which are separated by an axial expansion portion 210 of the sleeves. The first ends of the sleeves 184, 186 are secured to the housing 182 through fittings 212, 214 and three plates 216, 218 and 220 with the plate 220 including an extension 220*a* which defines a keyway for receiving a key 222 which allows the plate 220 to move axially within the housing 182 but not to rotate about its axis.

While operation of the illustrated valve should be apparent, it will now be briefly described. Rotation of the annular sleeve support member 188 changes the shape of the flow path through the sleeves 184, 186 from cylindrical, as shown in solid lines, to hyperbole, as shown in dotted lines, and the orifice diameters of the sleeves 184, 186 are reduced to restrict stock flow through the valve 180. The compression effect of the sleeves 184, 186 during torsion or twisting is accommodated by the axial expansion portion 210 of the sleeves 184, 186 and the keyed mounting of the first ends of the sleeves 184, 186 as described. During increased torsion of the sleeves 184, 186, the plate 220 will slide to the right without rotation because of the key 222, and the plate 220 will not transmit any torque to the fitting 212. The right side of the valve works in the same way as previously mentioned.

It should also be apparent that a single sleeve could be used in a torsional pinch valve in accordance with the teachings of this application for example by mounting the fitting 214 immediately adjacent the annular sleeve support member 188 accompanied by shortening of the housing 182 and elimination of the sleeve 186.

The described torsional pinch valve has no seals to wear out, and the number of parts is small. The design allows easy assembly to improve its reliability and further reduce its cost. Through the mechanical advantage of a worm/worm gear pair, it is easy to get precise movement of the annular sleeve support member 188 and high resolution and repeatability of stock flow control. For cleaning purposes, the valve can be operated in the opposite direction so that any existing fiber accumulation is disattached from the internal surfaces of the sleeves 184, 186 and removed with the flow of stock. To this end, it may be preferred to operate the valve in opposite directions whenever the headbox is shutdown and restarted such that cleaning becomes a part of the normal operation of the valve.

Having thus described the invention of the present application in detail and by reference to preferred embodiments thereof, it will be apparent that modifications and variations are possible without departing from the scope of the invention defined in the appended claims.

What is claimed is:

1. In a paper making machine, control apparatus for controlling at least one characteristic of a web of paper produced by said paper making machine, said paper making machine having a headbox for receiving and feeding a pulp slurry onto a wire for formation of a paper web, said headbox of said paper making machine including a plurality of dilution lines inserted therein, said control apparatus comprising:

a plurality of pinch valves corresponding in number and connected individually to said plurality of dilution lines for controlling a flow of dilution water through said plurality of dilution lines; and a control system coupled to said plurality of pinch valves for controlling said plurality of pinch valves to regulate the flow of pulp slurry from said paper making machine, said control system comprising a plurality of pinch valve controllers connected to said plurality of pinch valves with each of said plurality of pinch valve controllers comprising a differential pressure transducer for measuring a pressure differential from an inlet side of each of said plurality of pinch valves to an outlet side of each of said plurality of pinch valves and for generating a differential pressure signal representative of the measured pressure differential, said control system being responsive to differential pressure signals from said differential pressure transducers of said plurality of pinch valve controllers for controlling said plurality of pinch valves.

2. In a paper making machine, control apparatus for controlling at least one characteristic of a web of paper produced by said paper making machine, said paper making machine having a headbox for receiving and feeding a pulp slurry onto a wire for formation of a paper web, said headbox of said paper making machine including a plurality of dilution lines inserted therein, said control apparatus comprising:

a plurality of pinch valves corresponding in number and connected individually to said plurality of dilution lines for controlling a flow of dilution water through said plurality of dilution lines, each of said plurality of pinch valves comprising:

a flexible, constrictable sleeve defining a fluid flow path therethrough and having a first end for receiving fluid flowing into said fluid flow path and a second end for discharging fluid flowing from said fluid flow path;

a pinch valve support frame for supporting said sleeve by means of said first and second ends of said sleeve, said frame permitting rotation of at least one of said first and second ends of said sleeve; and a valve controller coupled to said pinch valve support frame for controlling the rotation of said at least one of said first and second ends of said sleeve such that a control area of said fluid flow path of said sleeve between said first and second ends is adjusted in accordance with said rotation; and a control system coupled to said plurality of pinch valves for controlling said plurality of pinch valves to regulate the flow of pulp slurry from said paper making machine.

3. In a paper making machine control apparatus for controlling at least one characteristic of a web of paper produced by said paper making machine, said paper making machine having a headbox for receiving and feeding a pulp slurry onto a wire for formation of a paper web, said headbox of said paper making machine including a plurality of dilution lines inserted therein, said control apparatus comprising:

a plurality of pinch valves corresponding in number and connected individually to said plurality of dilution lines for controlling a flow of dilution water through said plurality of dilution lines, each of said plurality of pinch valves comprising:

flexible, constrictable first and second sleeves each having first and second ends;

a pinch valve support frame for supporting said first and second sleeves in axial alignment with one another, said frame securing the first ends of each of said first and second sleeves at opposite ends of said frame;

an annular sleeve support member securing the second ends of said first and second sleeves to one another to define a continuous fluid flow path through said first and second sleeves, said member being supported by said pinch valve support frame between said opposite ends of said frame, said frame permitting rotation of at least one of said first ends of said first and second sleeves and said secured second ends of said first and second sleeves; and a valve controller coupled to said pinch valve support frame for controlling the rotation of said at least one of said first ends of said first and second sleeves and said secured second ends of said first and second sleeves such that a control area of said continuous fluid flow path through said first and second sleeves is adjusted in accordance with said rotation; and a control system coupled to said plurality of pinch valves for controlling said plurality of pinch valves to regulate the flow of pulp slurry from said paper making machine.

4. A torsional pinch valve for controlling fluid flow therethrough comprising:

flexible, constrictable first and second sleeves each having first and second ends;

a pinch valve support frame for supporting said first and second sleeves in axial alignment with one another, said frame securing the first ends of each of said first and second sleeves at opposite ends of said frame;

an annular sleeve support member securing the second ends of said first and second sleeves to one another to define a continuous fluid flow path through said first and second sleeves, said member being supported by said pinch valve support frame between said opposite ends of said frame, at least one of said first ends of said first and second sleeves and said secured second ends of said first and second sleeves being mounted in said pinch valve support frame for rotation relative to said pinch valve support frame; and a valve controller coupled to said pinch valve support frame for controlling the rotation of said at least one of said first ends of said first and second sleeves and said secured second ends of said first and second sleeves such that a control area of said continuous fluid flow path through said first and second sleeves is adjusted in accordance with said rotation.

5. A torsional pinch valve as claimed in claim 4 wherein at least one of said first and second sleeves each comprise an axially expandable portion.

6. A torsional pinch valve as claimed in claim 5 wherein said first ends of said first and second sleeves are secured by said frame against rotation and said annular sleeve support member is mounted for rotation within said frame for rotation of said secured second ends of said first and second sleeves.

7. A torsional pinch valve as claimed in claim 6 wherein said first and second sleeves each comprise an axially expandable portion.

8. A torsional pinch valve as claimed in claim 7 wherein said annular sleeve support member is received within bearings on said support frame for rotation about an axis of said annular sleeve support member, said valve controller being coupled between said pinch valve support frame and said annular sleeve support member.

9. A torsional pinch valve as claimed in claim 8 further comprising a worm gear extending around at least a portion of an outer periphery of said annular sleeve support member and a worm engaging said worm gear and mounted to said pinch valve support frame for rotation to thereby rotate said annular sleeve support member about its axis.

10. A torsional pinch valve as claimed in claim 9 further comprising a motor mounted to said pinch valve support frame for rotating said worm gear.

* * * * *